US006174112B1

(12) United States Patent
Kleine et al.

(10) Patent No.: US 6,174,112 B1
(45) Date of Patent: Jan. 16, 2001

(54) TOOL FOR HAND-HELD EQUIPMENT

(75) Inventors: Werner Kleine, Achim; Hans-Werner Bongers-Ambrosius, Munich, both of (DE)

(73) Assignee: Hilti Aktiengesellschaft, Schaan (LI)

( * ) Notice: Under 35 U.S.C. 154(b), the term of this patent shall be extended for 0 days.

(21) Appl. No.: 09/306,868

(22) Filed: May 7, 1999

(30) Foreign Application Priority Data

May 4, 1998 (DE) .............................................. 198 19 631

(51) Int. Cl.[7] ...................................................... B23B 51/00
(52) U.S. Cl. ............................................ 408/226; 279/19.4
(58) Field of Search ........................... 279/19, 19.4, 19.5; 408/226

(56) References Cited

U.S. PATENT DOCUMENTS 3,637,225 * 1/1972 Schmuck .............................. 408/226
4,123,074 10/1978 Wanner ................................ 408/226
4,717,292 * 1/1988 Phillips ................................ 408/226
5,346,340 * 9/1994 Runge .................................. 408/226
5,421,628 * 6/1995 Obermeier et al. .................. 408/226

FOREIGN PATENT DOCUMENTS 4338818 5/1995 (DE) .
0181093 5/1986 (EP) .

* cited by examiner

*Primary Examiner*—Steven C. Bishop
(74) *Attorney, Agent, or Firm*—Brown & Wood, LLP

(57) ABSTRACT

A tool for hand-held equipment and including a shank (2; 22; 32) with a clamping region (3; 23; 33) having a diameter (t) equal to or greater than 12 mm, at least one locking groove (4; 24; 34) provided in the clamping region (3; 23, 33), and at least one drive groove (6; 26; 36) provided in the clamping region (3; 23; 33), with the at least one locking groove (4; 24; 34) and the at least one drive groove (6; 26; 36) having each a depth (v; d) equal to or greater than 2.5 mm and opposite edges (8; 9) lying on a shank circumference, and forming with each other, an aperture angle (α; β) equal to or greater than 50°.

12 Claims, 2 Drawing Sheets

TOOL FOR HAND-HELD EQUIPMENT

BACKGROUND OF THE INVENTION

1. Field of the Invention

The present invention relates to a tool for a hand-held equipment and including a shank having, in its clamping region, at least one looking groove and at least one drive groove which opens toward the rear end of the shank.

2. Description of the Prior Art

The prior art discloses a number of tools the shanks of which are specifically adapted for insertion in a chuck of a hand-held equipment. Such tools are disclosed, e.g., in European Publications EP-A-0 433 876, EP-B-0 550 489, EP-A-0 584 706 and German Publications DE-A-43 03 545 and DE-U-093 19 009. The tools described in these publications differ from each other by the arrangement and shape of the drive grooves provided on the tool shank or of the driving elements provided in the chuck of the hand-held equipment. In addition to drive grooves, locking grooves are provided on the shank which, in distinction from the drive grooves, are generally axially closed. The locking grooves should prevent a tool from out of the chuck of the hand-held equipment. They also contribute to the torque transmission.

An object of the present invention is a tool for hand-held equipment and having drive grooves and locking grooves the shape and dimensions of which are so selected that the torque transmission and retaining of the tool in the chuck are optimized.

Another object of the present invention is a tool having a sufficiently large, non-weakened remnant cross-section of the shank which is adequate for an optimal transmission of a large energy of a single blow of modern percussion hand-held equipments, and which has an adequate fracture resistance.

SUMMARY OF THE INVENTION

These and other objects of the present invention, which will become apparent hereinafter, are achieved by providing a tool with a shank in a clamping region of which there are provided at least one drive groove and at least one locking groove. The clamping region has a diameter equal to or greater than 12 mm. The at least one locking groove and the at least one drive groove have each a depth equal to or greater than 2.5 mm. Opposite edges of the at least one locking groove and the at least one drive groove, which lie on the shank circumference, form, respectively, an aperture angle equal to or greater than 50°.

The selected diameter of the clamping region of the shank and of the depth of the locking and drive grooves insure that an adequately large solid cross-section of the shank remains after the grooves are formed. Advantageously, the largest depth of the locking and drive grooves is smaller than 3.5 mm. The aperture angle is defined as an angle between the radii which connect the edges of the side surfaces of the locking groove or the drive groove with the shank axis. The chamfers of the transition regions are not taken into account. In case when there are provided several locking and/or drive grooves, it is sufficient when at least one locking groove and at least one drive groove have an aperture angle equal to or greater than 50°. A further locking groove and a further drive groove can have a smaller aperture angle.

The depth and the aperture angle of the drive groove provide a sufficiently large entrained surface which insures a transmission of a torque from the driving means of the chuck to the inserted tool. Advantageously, the diameter of the clamping region of the chuck is equal to about 14 mm, and the depth of the drive groove is equal to about 2.6 mm. The aperture angles of the locking and drive grooves are advantageously so selected that the smallest angular distance between them is larger than 15° and, preferably, at least 20°. Thereby, a sufficiently wide, non-weakened material web remains between the locking groove and the drive groove, which advantageously increases the service life of the tool.

A balanced ratio exists between the surface of the drive groove and the depth of the locking groove. As a result, an adequately large, non-weakened, remnant cross-section of the tool shank is obtained. Advantageously, the depths of the locking and drive grooves are so selected that a region of a respective groove, which is closest to the axis of the shank, is radially spaced form the shank axis by a distance which is smaller than 0.65 of the shank radius in the clamping region.

According to an advantageous embodiment of the present invention, the aperture angles of the locking groove and of the drive groove differ from each other by less than ±10°, preferably, by ±6°. When the locking and drive grooves have approximately the same aperture angles, the clamping region of the shank is weakened over the same angular regions of its circumference. This permits to obtain, even at smaller diameters of the shank, a sufficiently large, non-weakened cross-section.

An advantageous relationship between the size of the entrained surface and the remnant, non-weakened cross-section of the shank is obtained with an aperture angle of the drive groove smaller than 75° and, preferably, smaller than 60°.

A uniform guidance of the tool in a chuck is advantageously obtained when there are provided two locking grooves located diametrically opposite each other. At that, the two locking grooves have the same aperture angle.

In order to obtain a sufficiently large remnant cross-section of the shank when two locking grooves are provided, the distance between the closest to each other regions of the two locking grooves is so selected that it amounts to from about 0.6 to 0.7 of the shank diameter.

Advantageously, the locking groove has an arcuate cross-section. Advantageously, when two locking grooves located diametrically opposite each other are provided, a ratio of the radius of the locking groove arc to the shank radius is selected in a range from about 0.54 to about 0.6. This insures that an adequate remnant cross-section of the shank in the clamping region is obtained.

For increasing the entrained surface, advantageously two, located diametrically opposite each other, drive grooves are provided. To provide for a symmetrical loading of the tool during an operation, both drive grooves have the same aperture angle. In this case, advantageously all of the locking and drive grooves have an aperture angle equal to or greater than 50°.

In accordance with a further advantageous embodiment of the present invention, the edges of the drive grooves, which are remote from the respective edges of the respective locking grooves which follow, along the circumference of the shank, the respective drive grooves, are spaced from the respective remote edges of the respective locking grooves by a minimum angular distance of about 90°. During the tool operation, in particular, when the tool is a drill and/or chisel, the driving element and the locking means of the chuck almost simultaneously engage the side surfaces of the locking and drive grooves. Therefore, the locking grooves also contribute to the transmission of the torque over a certain portion of the circumference, with the load on drive grooves being reduced. This favorably influences the service life of the tool.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
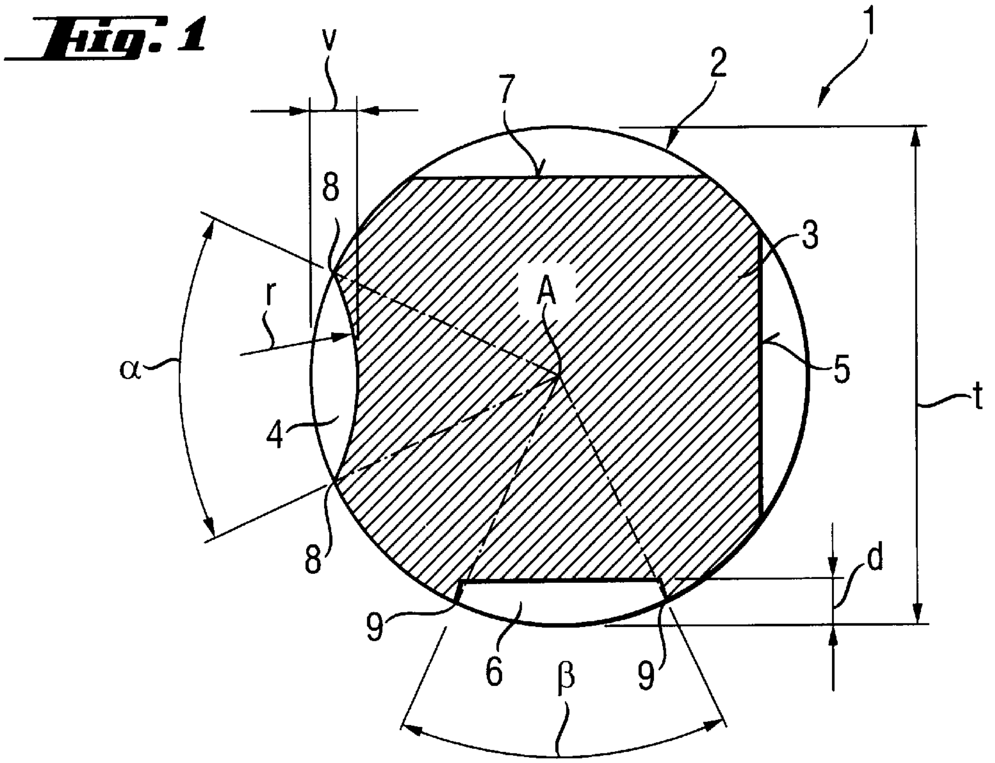
FIG. 1 shows a cross-sectional view of a clamping region of a shank of a first embodiment of a tool according to the present invention for a hand-held equipment.
Figure 2:
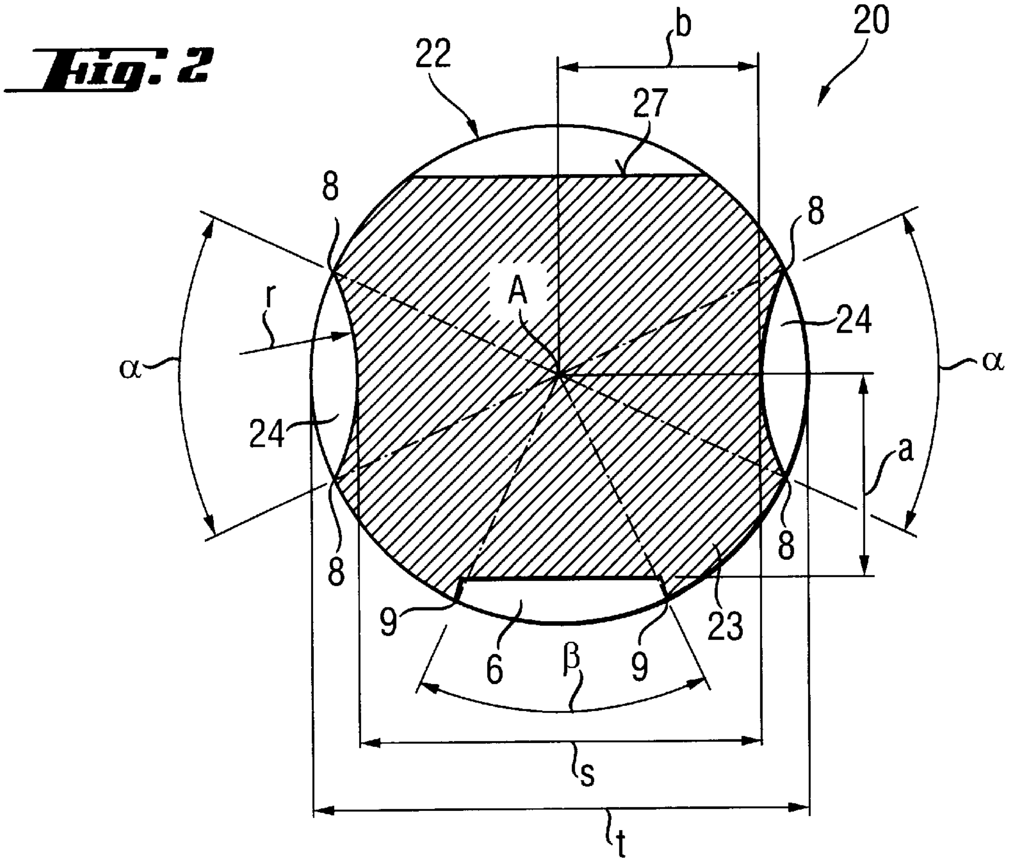
FIG. 2 shows a cross-sectional view of a clamping region of a shank of a second embodiment of a tool according to the present invention for a hand-held equipment.
Figure 3:
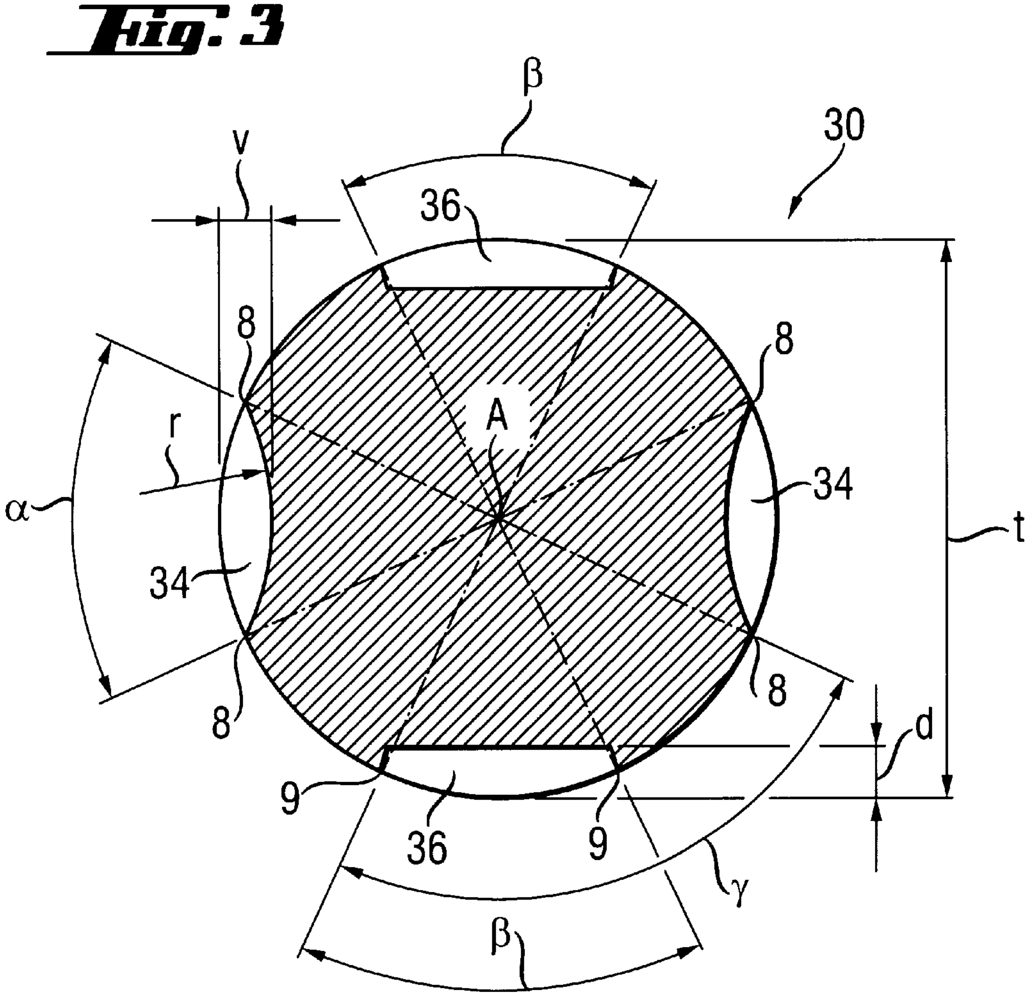
FIG. 3 shows a cross-sectional view of a clamping region of a shank of a third embodiment of a tool according to the present invention for a hand-held equipment.
Figure 4:
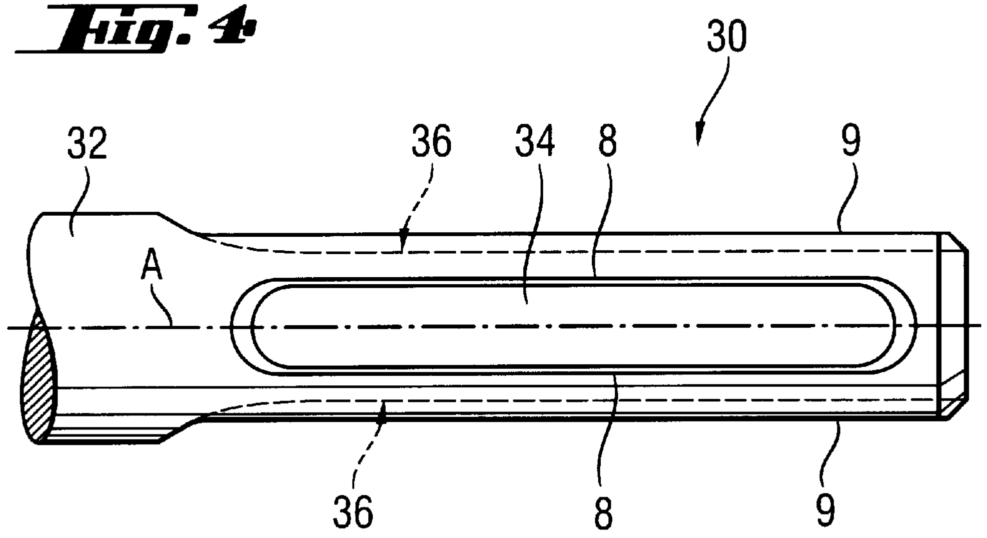
FIG. 4 shows an elevational view of a clamping region of the shank of the tool shown in FIG. 3.

FIGS. 1 through 4 show a clamping region of a shank of a drill or a chisel insertable in a chuck of a hand-held equipment, of a boring and/or chisel apparatus of the assignee of the present application. The shank 2 has a clamping region 3 having a diameter t which is equal to or larger than 12 mm. Advantageously, the diameter t of the clamping region 3 amounts to about 14 mm. FIGS. 1–3 show a cross-section of the clamping region 3 of the shank 2, and FIG. 4 shows an elevational view of one, third, embodiment of the inventive tool.

The embodiment of the inventive tool, which is shown in FIG. 1, is generally designated with a reference numeral 1. axially closed locking groove is designated with a reference numeral 4. The edges 8 of the preferably arcuate locking groove 4 are located on the shank circumference. The radii, which extend from the axis A of the shank 2 toward the edges 8 of the locking groove 4 form an aperture angle α. The aperture angle α is equal to or is greater than 50°. The depth v of the locking groove 4 amounts to about 2.5 mm. Opposite the locking groove 4, there is provided a flattened side surface 5. Thereby, the shank 2 of the tool 1 is securable in the chuck of a hand-held equipment with two locking members arranged opposite each other.

A drive groove 6, which is open at the shank rear end, is offset with respect to the locking groove 4 by about 90°. The middle region of the groove 6 and a point of a bottom of the locking groove 4, which is closest to the axis A, serve as reference points for the determination of an angular distance between the drive groove 6 and the locking groove 4. The drive groove 6 has a substantially trapezoidal cross-section. The edges 9 of the drive groove 6 lie on the circumference of the shank 2. The radii, which extend from the axis A toward the edges 9 form an aperture angle β equal to a greater than 50°. In the embodiment of the shank shown in FIG. 1, the aperture angles α and β of the locking groove 4 and the drive groove 6 are approximately equal. "Approximately equal" means that the angle difference is about ±10°, preferably ±6°. The depth d of the drive groove 6 is larger than 2.5 mm and amounts, with the shank diameter t being equal about 14 mm, to preferably 2.6 mm. Opposite to the drive groove 6, there is provided a flattened side surface 7. This permits to insert the shank 2 of the tool according to the present invention in a chuck having two opposite driving strips. Preferably, the side surface 7 is offset with respect to side surface 5 by an angle somewhat smaller than 90°.

Another embodiment of the inventive drill and/or chisel, which is shown in FIG. 2, is generally designated with a reference numeral 20. The shank is designated with a reference numeral 22, and the clamping region is designated with a reference numeral 23. The tool, e.g., a drill or chisel 20, differs from the tool 1 of FIG. 1 in that it has two locking grooves 24 located opposite each other on opposite sides of a drive groove 26. Each of the locking grooves 24 is offset with respect to the drive groove 26 by about 90°. Diametrically opposite the drive groove 26, there is provided a flattened side surface 27. Thus, the working tool 20 shown in FIG. 2 can likewise be inserted in a chuck having two opposite driving strips. The diametrically opposite locking grooves 24 have the same aperture angle α. Both the aperture angle α of the locking groove 24 and the aperture angle β of the drive groove 26 are equal to or greater than 50°. Preferably, both aperture angles α and β are approximately the same. The ratio of the distance a of the bottom of the drive groove 26 from the axis A to a radius t/2 of the shank 22 is smaller than 0.65. The ratio of the distance s between the points of the bottoms of the diametrically opposite locking grooves 24, which are closest to each other, to the diameter t of the shank 22 amounts to from about 0.6 to about 0.7. Both locking grooves 24 have preferably an arcuate cross-section. The ratio of the radius r of the locking groove arc to the diameter t of the shank 22 amounts to from about 0.54 to about 0.6.

FIGS. 3 and 4 show a further embodiment of a tool according to the present invention, which is generally designated with a reference numeral 30. The clamping region 33 of the shank 32 of the tool 30 has two locking grooves 34 and two drive grooves 36 which are located, respectively, diametrically opposite each other. Both drive grooves 36 have the same aperture angle β which is approximately equal to the aperture angle α of the locking grooves 34. The edges 9 of the drive grooves 36, remote from the respective edges 8 of respective locking groove 34, which follow, along the circumference of the shank 32 the respective drive grooves (36), are angularly spaced from the remote edges 8 by an angle of preferably about 90°, respectively.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A tool for hand-held equipment, comprising a shank (2; 22; 32) including a clamping region (3; 23; 33) having a diameter (t) equal to or greater than 12 mm; at least one locking groove (4; 24; 34) provided in the clamping region (3; 23; 33) and at least one drive groove (6; 26; 36) provided in the clamping region (3; 23; 33), the at least one locking groove (4; 24; 34) and the at least one drive groove (6; 26; 36) having each a depth (v, d) equal to or greater than 2.5 mm and opposite edges (8; 9) lying on a shank circumference and forming with each other an aperture angle (α; β) equal to or greater than 50°.

2. A tool according to claim 1, wherein the at least one locking groove (4; 24; 34) and the at least one drive groove (6; 26; 36) have each a region which is closest to an axis (A) of the shank (2; 22; 32), with a ratio of a radial distance (a;

b) of the closest region from the axis (A) of the shank (2; 22; 32) to a radius (t/2) of the shank (2; 22; 32) being smaller than 0.65.

3. A tool according to claim 1, wherein the aperture angles (α, β) of the at least one locking groove (4; 24; 32) and of the at least one drive groove (6; 26; 36) differ from each other by less than ±10°.

4. A tool according to claim 3, wherein the aperture angles (α, β) of the at least one locking groove (4; 24; 34) and of the at least one drive groove (6; 26; 36) differ from each other by ±6°.

5. A tool according to claim 3, wherein the aperture angle (β) of the drive groove (6; 26; 36) is smaller than 75°.

6. A tool according to claim 5, wherein the aperture angle (β) of the drive groove (6; 26; 36) is smaller than 60°.

7. A tool according to claim 1, wherein the shank (22; 32) has two locking grooves (24; 34) provided in the clamping region (23, 33), located diametrically opposite each other, and opposite edges of which form, respectively, a same aperture angle (α).

8. A tool according to claim 7, wherein a ratio of a distance(s) between closest regions of the two locking grooves (24; 34) to a shank diameter (t) is in a range from about 0.6 to 0.7.

9. A tool according to claim 1, wherein the at least one locking groove (4; 24; 34) has an arcuate cross-section a ratio of a radius (r) of which to a radius (t/2) of the shank (2; 22; 32) is in a range from about 0.54 to about 0.6.

10. A tool according to claim 1, wherein the shank (32) has two diametrically opposite drive grooves (36) having a same aperture angle (β).

11. A tool according to claim 1, wherein the shank (32) has two diametrically opposite locking grooves (34) and two diametrically opposite drive grooves (36), and wherein edges (8; 9) of all of the locking and drive grooves (34; 36) form, respectively, an aperture angle (α; β) equal to or greater than 50°.

12. A tool according to claim 11, wherein the edges (9) of the drive grooves (36) remote from the respective edges (8) of the respective locking grooves (34) which follow, along the shank circumference, the respective drive grooves (36), are spaced from the respective remote edges (8) by a minimum angular distance (γ) of about 90°.

* * * * *